(12) United States Patent
Matsuda

(10) Patent No.: US 12,151,524 B2
(45) Date of Patent: Nov. 26, 2024

(54) MOTORCYCLE TIRE

(71) Applicant: BRIDGESTONE CORPORATION, Tokyo (JP)

(72) Inventor: Mitsuyuki Matsuda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 39 days.

(21) Appl. No.: 17/797,046

(22) PCT Filed: Jan. 12, 2021

(86) PCT No.: PCT/JP2021/000666
§ 371 (c)(1),
(2) Date: Aug. 2, 2022

(87) PCT Pub. No.: WO2021/166489
PCT Pub. Date: Aug. 26, 2021

(65) Prior Publication Data
US 2023/0107811 A1     Apr. 6, 2023

(30) Foreign Application Priority Data

Feb. 19, 2020   (JP) .................................. 2020-026557

(51) Int. Cl.
*B60C 9/06*     (2006.01)
*B60C 9/02*     (2006.01)
(Continued)

(52) U.S. Cl.
CPC .............. *B60C 9/06* (2013.01); *B60C 9/0207* (2013.01); *B60C 9/18* (2013.01); *B60C 15/0045* (2013.01);
(Continued)

(58) Field of Classification Search
CPC ..... Y10T 152/10837; Y10T 152/10864; B60C 15/0632; B60C 15/0045; B60C 9/0207; B60C 9/06
(Continued)

(56) References Cited

U.S. PATENT DOCUMENTS 4,287,929 A    9/1981   Huinink
4,706,725 A *  11/1987  Okuni ................. B60C 15/0045
                                                    152/554
(Continued)

FOREIGN PATENT DOCUMENTS

EP    0 483 710 A1    5/1992
EP    2 583 838 B1    1/2019
(Continued)

OTHER PUBLICATIONS

Mar. 23, 2021 International Search Report issued in International Patent Application No. PCT/JP2021/000666.
(Continued)

*Primary Examiner* — Adrienne C. Johnstone
(74) *Attorney, Agent, or Firm* — Oliff PLC

(57) ABSTRACT

A motorcycle tire that includes a carcass as a skeleton composed of at least one carcass ply extending toroidally between a pair of bead portions and folded and engaged around a pair of bead cores embedded in each of the pair of bead portions and a belt composed of at least one belt layer arranged on the outer side of the carcass in the tire radial direction. A flipper is arranged between the carcass and a bead core, which wraps the bead core from the inside in the tire radial direction, and the outer side end portion of the flipper in the tire width direction extends to the inside in the tire width direction from the end portion of the belt in the tire width direction.

4 Claims, 2 Drawing Sheets

(51) Int. Cl.
B60C 9/18 (2006.01)
B60C 15/00 (2006.01)
B60C 15/06 (2006.01)

(52) U.S. Cl.
CPC .......... B60C 15/06 (2013.01); B60C 15/0632 (2013.01); *B60C 2200/10* (2013.01); *Y10T 152/10837* (2015.01)

(58) Field of Classification Search
USPC .................. 152/542, 546, 551, 554, 555
See application file for complete search history.

(56) References Cited

U.S. PATENT DOCUMENTS

| | | | |
|---|---|---|---|
| 4,744,400 A | 5/1988 | Sekoguchi | |
| 4,854,362 A * | 8/1989 | Carolla | B60C 15/0045 152/554 |
| 6,345,658 B1 * | 2/2002 | Shida | B60C 9/0207 152/551 X |
| 9,296,262 B2 * | 3/2016 | Kato | B60C 9/0207 |
| 2008/0190537 A1 * | 8/2008 | Nakagawa | B60C 15/0632 |
| 2016/0101652 A1 * | 4/2016 | Laurent | B60C 9/06 |

FOREIGN PATENT DOCUMENTS

| | | |
|---|---|---|
| JP | H04-278806 A | 10/1992 |
| JP | H11-222007 A | 8/1999 |
| JP | 2005-081873 A | 3/2005 |
| JP | 2013-166526 A | 8/2013 |

OTHER PUBLICATIONS

Jun. 20, 2023 Extended European Search Report issued in European Patent Application No. 21756925.0.

* cited by examiner

MOTORCYCLE TIRE

TECHNICAL FIELD

This invention relates to a motorcycle tire (hereinafter also referred to simply as "tire"), and more specifically, to a pneumatic tire for motorcycles in which a side portion is improved.

BACKGROUND ART

Typically, the basic structure of a motorcycle tire includes at least one carcass ply extending toroidally between a pair of bead portions as a skeleton and at least one belt layer arranged outside the tire radial direction of the carcass ply as a reinforcing member of a tread portion.

As a prior art relating to motorcycle tires, for example, Patent Document 1 discloses, for the purpose of solving lack of lateral force and lack of durability caused by lack of rigidity of a side portion, a motorcycle pneumatic radial tire in which a flipper layer is arranged on the outside of a carcass ply, folded around a bead core from the inside to the outside of the tire, the folded end of which terminates between the carcass ply and the belt layer.

Patent Document 2 discloses a motorcycle pneumatic bias tire, wherein for a carcass layer formed by at least two carcass plies, cords of carcass plies have a predetermined difference in initial tensile resistance, end count, and constant load intermediate elongation and are inclined in opposite directions to the tire equator at a predetermined angle with respect to each other, for the purpose of enabling both tire case rigidity and tire case flexibility to improve ground contact and handling stability.

RELATED ART DOCUMENTS

Patent Documents

[Patent Document1] JP 2013-166526A
[Patent Document2] JP H11-222007A

SUMMARY OF THE INVENTION

Problems to be Solved by the Invention

In recent years, as motorcycles have become larger, the weight of vehicles has increased, and motorcycle tires that support such vehicles are also required to cope with this. In particular, motorcycle tires mounted on large motorcycles, which are subject to high loads and torques, are required to have sufficient longitudinal rigidity, excellent handling stability, and excellent durability.

It is therefore an object of the present invention to provide a motorcycle tire having excellent handling stability and durability.

Means for Solving the Problems

As a result of intensive study, the present inventor found that the above-described problem can be solved by arranging a flipper between a carcass and a bead core, and by rolling up an outer side end portion of the flipper in the tire width direction to the inner side in the tire width direction from an end portion of a belt layer in the tire width direction, thereby completing the present invention.

In other words, the present invention is a motorcycle tire including a carcass as a skeleton composed of at least one carcass ply extending toroidally between a pair of bead portions and folded and engaged around a pair of bead cores embedded in each of the pair of bead portions and a belt composed of at least one belt layer arranged on the outer side of the carcass in the tire radial direction, wherein a flipper is arranged between the carcass and the bead core to wrap the bead core from the inside in the tire radial direction, and an outer side end portion of the flipper in the tire width direction extends to the inside in the tire width direction from an end portion of the belt in the tire width direction.

In the tire of the present invention, it is preferable that an outer end portion of the carcass in the tire width direction extends to the inner side in the tire width direction from the end portion of the belt in the tire width direction. In the tire of the present invention, it is preferable that a height FH of an inner end portion of the flipper in the tire width direction is lower than a height SWH of the tire maximum width position, and it is more preferable that the ratio of the height FH of the inner end portion of the flipper in the tire width direction to the height SWH of the tire maximum width position is from 30% to less than 100%.

Furthermore, in the tire of the present invention, it is preferable that the ratio of an overlap width FL between the belt and the flipper to an overlap width CL between the belt and the carcass, measured along the tire surface in the tire width direction, is in the range of from 25% to 80%. The tire of the present invention is particularly suitable as a bias tire.

In the present invention, unless otherwise specified, the dimensions of a tire are those measured under no load, with the tire mounted on rims specified in the industrial standards in effect in a region where the tire is produced and used, and filled with an internal pressure specified in such industrial standards. The above-described industry standards are, for example, JATMA (Japan Automobile Tyre Manufacturers Association) YEAR BOOK in Japan, ETRTO (European Tyre and Rim Technical Organisation) STANDARD MANUAL in Europe, and TRA (THE TIRE and RIM ASSOCIATION INC.) YEAR BOOK in the United States.

Effects of the Invention

According to the present invention, the above-described configuration enables realization of a motorcycle tire having excellent handling stability and durability.

MODE FOR CARRYING OUT THE INVENTION

In the following, embodiments of the present invention will be described in detail with reference to the drawings.

Figure 1:
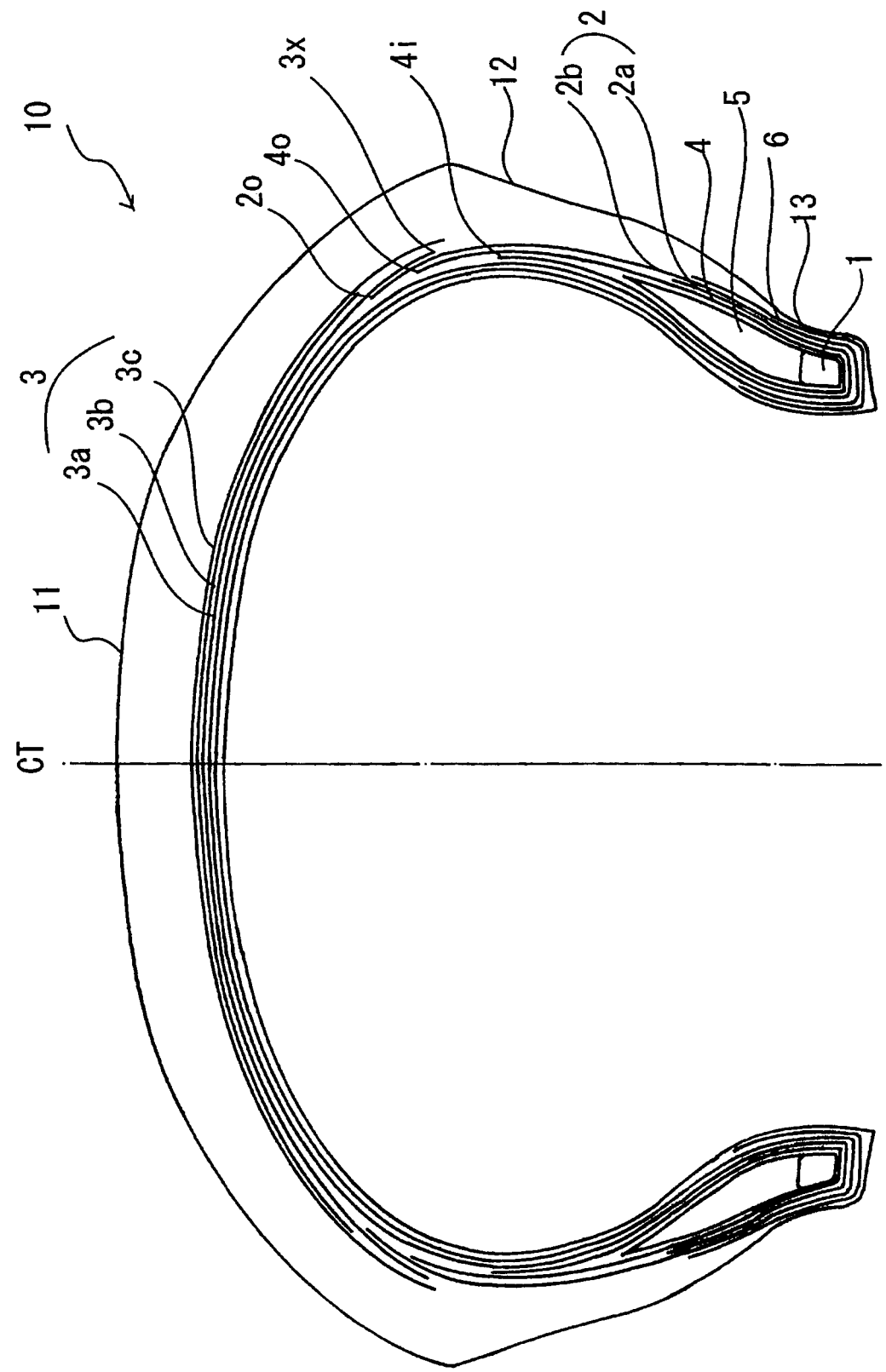
FIG. 1 is a sectional view in the width direction illustrating one example of a motorcycle tire of the present invention.
Figure 2:
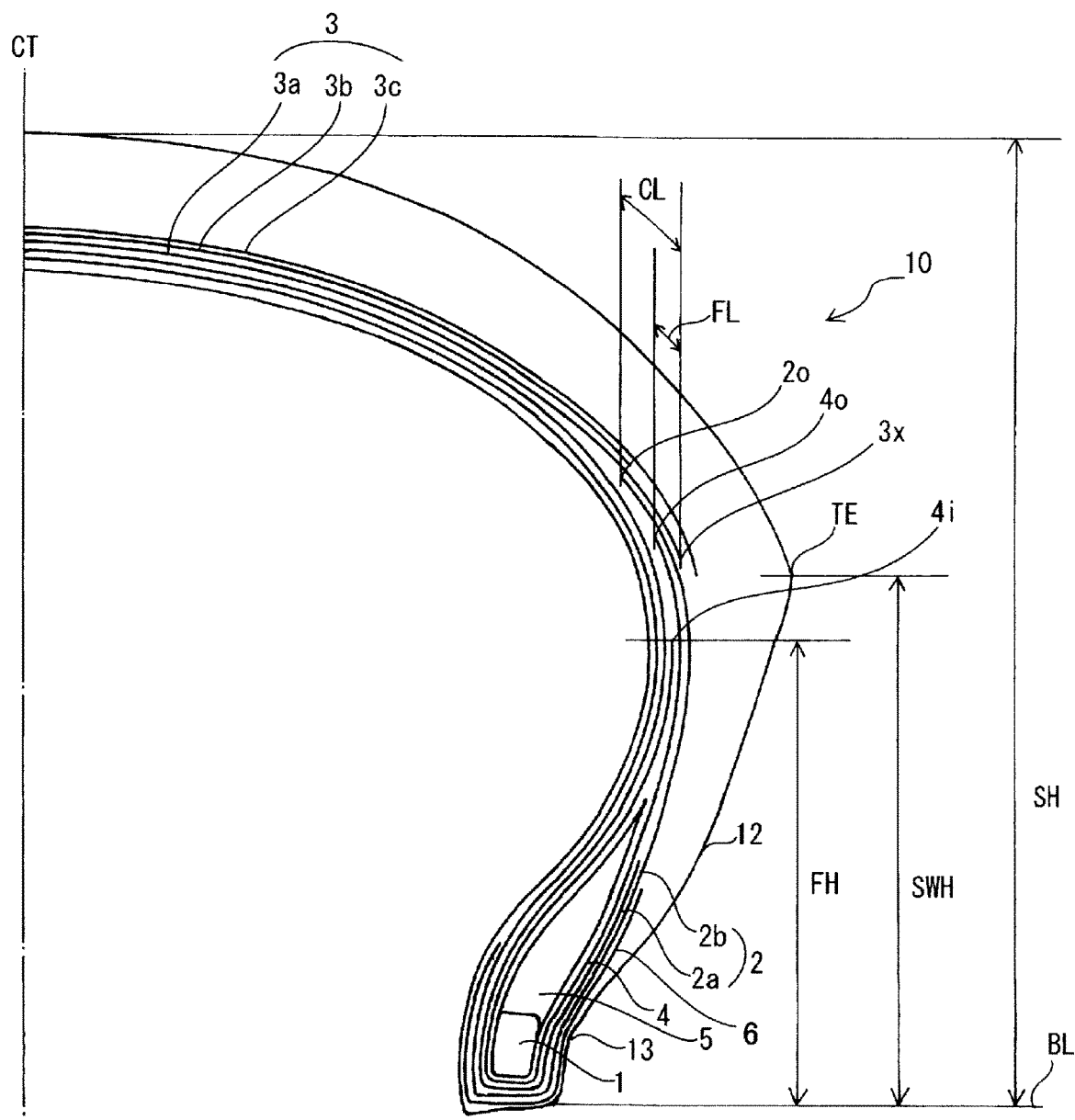
FIG. 2 is one side of the sectional view in the width direction of the motorcycle tire of FIG. 1.

FIG. 1 shows a sectional view in the width direction illustrating one example of a motorcycle tire of the present invention. FIG. 2 shows one side of the sectional view in the width direction of the motorcycle tire of FIG. 1. As illustrated, a motorcycle tire 10 of the present invention has a tread portion 11 forming a ground contact area, and a pair of sidewall portions 12 and bead portions 13 extending from both ends thereof to the inside in the tire radial direction, respectively.

The tire 10 of the present invention, illustrated in the figure, includes a carcass 2 as a skeleton composed of at least one, two carcass plies 2a, 2b in the example shown, which extend toroidally between a pair of bead portions 13 and are folded and engaged around a pair of bead cores 1 respectively embedded in the pair of bead portions 13. Furthermore, a belt 3 composed of at least one, and in the example illustrated, three belt layers 3a-3c are arranged on the outer side of the carcass 2 in the tire radial direction.

The present invention is characterized in that a flipper 4 is arranged between a carcass 2 and a bead core 1 to wrap the bead core 1 from the inner side in the tire radial direction, and an outer side end portion 40 of the flipper 4 in the tire width direction is rolled up to a tread portion 11 and extends to the inner side in the tire width direction from an end portion 3x of the belt 3 in the tire width direction.

According to the present invention, such a configuration can increase the rigidity of side portions to improve the handling stability of motorcycles and increase the durability of tires. Since side rigidity is increased by arrangement of the flipper 4, appropriate shock absorption can be maintained, and ride comfort is not compromised. This enables realization of a tire having increased longitudinal rigidity suitable also for large motorcycles, which are subject to much higher loads and torques than conventional tires.

In the present invention, an outer side end portion 40 of the flipper 4 in the tire width direction is extended to the inner side of the tire width direction from the end portion 3x of the belt 3 in the tire width direction because the positions of the end portions of members are not coincident in the tire width direction to suppress stress concentration.

Here, in the tire of the present invention, a belt layer is made up of three pieces in the example illustrated, and can be made up of at least one piece, preferably two or more, and more preferably three or more, for example, one to five pieces, and particularly two to three pieces. When a belt layer is made up of two or more layers, the end portion 3x of the above-described belt 3 in the tire width direction means the end portion of the innermost belt 3a in the tire width direction that is the innermost in the tire radial direction and adjacent to a carcass 2 among belt layers 3a to 3c, as illustrated in the figure.

As illustrated in the figure, in the present invention, the outer end portion 20 of the carcass 2 in the tire width direction preferably extends to the inner side of the tire width direction from the end portion 3x of the belt 3 in the tire width direction. Such a configuration allows end portions of each member to be positioned differently in the tire width direction, thereby suppressing stress concentration and preventing rigidity steps from occurring, thereby further improving durability. In this case, the outer end portion 20 of the carcass 2 in the tire width direction is positioned on the inner side of the belt 3 in the tire radial direction.

Here, in the tire of the present invention, the carcass ply is made up of two pieces in the example illustrated, but may be made up of at least one piece, preferably two or more pieces, and even three or more pieces. When carcass plies are made up of two or more layers, as described above, usually, the outer end portion 20 in the tire width direction of the carcass ply 2b, which is one of the plurality of layers of carcass plies 2a and 2b and is folded around the bead core and rolled up to a higher position, should extend to the inner side of the tire width direction from the end portion 3x of the belt 3 in the tire width direction. In particular, from the viewpoint of durability and ride comfort, a configuration in which one carcass ply 2b provided on the inner side of the tire radial direction extends to the inner side of the tire width direction from the end portion 3x of the above-described belt 3 in the tire width direction is suitable. Although the height of rolling up of the other carcass ply 2a is not limited, as illustrated in the figure, a height that does not reach the tread portion 11 is preferable from the viewpoint of preventing the side portions from becoming too rigid and maintaining the ride comfort.

In the present invention, the ratio of the overlap width FL of the belt 3 and the flipper 4 to the overlap width CL of the belt 3 and the carcass 2, measured along the tire surface in the tire width direction, is suitably in the range from 25% to 80%, and more suitably from 30% to 75%. By setting the ratio FL/CL of the overlap width CL between the belt 3 and the carcass 2 to the overlap width FL between the belt 3 and the flipper 4 in the range of from 25% to 80%, expressed as a percentage, when compared at the so-called peripheral length, stress concentration can be suppressed and rigidity steps can be avoided, thereby further improving durability.

Specifically, the overlap width CL between the belt 3 and the carcass 2 is preferably from 3 to 25 mm, and more preferably from 5 to 20 mm. Specifically, the overlap width FL between the belt 3 and the flipper 4 is preferably from 1 to 20 mm, and more preferably from 3 to 15 mm.

In the present invention, the height FH of the inner end portion 4i of the flipper 4 in the tire width direction is preferably lower than the height SWH of the tire maximum width position, i.e., the tread end portion TE. This allows suppression of stress concentration while preventing rigidity steps from occurring, thereby further improving durability.

Specifically, the ratio of the height FH of the inner end portion 4i of the tire in the tire width direction of the flipper 4 to the height SWH of the tire maximum width position is preferably in the range of from 30% to less than 100%, and more preferably from 50% to 85%. By setting the ratio FH/SWH between the height SWH of the tire maximum width position and the height FH of the inner end portion 4i of the flipper 4 in the tire width direction, expressed as a percentage, to the range of from 30% to less than 100%, stress concentration can be more effectively suppressed and no rigidity steps can be generated, thereby further improving durability.

In the present invention, the height FH of the inner end portion 4i of the flipper 4 in the tire width direction, the height SWH at the tire maximum width position, and the tire sectional height SH, which is described below, are defined with respect to a bead baseline BL. The bead baseline BL means a straight line parallel to the tire axis passing through the position of the rim diameter of a rim as specified in the above-described industrial standards in a tire width direction section.

In the present invention, the only important point is the arrangement of the above-described flipper 4, which allows a desired effect of the present invention to be obtained. In the present invention, configurations such as materials and arrangement conditions of members other than the flipper 4 are not particularly restricted, and can be determined according to usual methods. For example, in the tire of the present invention, a bead filler 5 can be arranged on the outer side of the bead core 1 in the tire radial direction, and a chaffer (reinforcement layer) 6 can be arranged on the inner side of the carcass 2 in the bead portion 13 in the tire radial direction. Furthermore, an inner liner, not illustrated, can be arranged in the innermost layer of the tire.

In the tire of the present invention, the cord angle of the ply cords in a carcass ply is suitably from 20° to 50° with respect to the tire equator CT at the tire crown. When two or more carcass plies are provided, two or more carcass plies are arranged in such a manner that the direction of the cords of the two or more carcass plies intersect with each other. The end count of the ply cords in a carcass ply can suitably be from 3 to 10 cords/5 mm, which maintains sufficient rigidity in the side portions.

In the tire of the present invention, the cord angle of the belt cords in a belt layer is suitably from 15° to 80°, and more suitably from 15° to 45° with respect to the tire equator CT. When two or more belt layers are provided, at least some of the belt layers are arranged in such a manner that the direction of the cords intersect each other. The end count of belt cords in a belt layer can suitably be from 2 to 10 cords/5 mm.

Furthermore, in the tire of the present invention, the cord angle of a reinforcing cord at the flipper 4 is suitably from 20° to 60°, and more suitably from 30° to 55° with respect to the tire radial direction. The end count of reinforcing cords in a flipper can suitably be from 2 to 6 cords/5 mm, and more suitably from 3 to 4 cords/5 mm.

Furthermore, the materials of organic fiber cords that can be suitably applied to a carcass ply, a belt layer, and a flipper in the tire of the present invention can be selected from polyamide (for example, nylon), polyethylene terephthalate (PET), polyethylene naphthalate (PEN), aramid (for example, Kevler (trade name)), and rayon, and the others having material properties comparable to those of these organic fiber materials, in a suitable combination, depending on the purpose and application.

Furthermore, in the tire of the present invention, the ratio of the height SWH at the tire maximum width position to the tire sectional height SH is preferably in the range of from 40% to 75%. By setting the ratio SWH/SH between the tire sectional height SH and the height SWH at the tire maximum width position, expressed as a percentage, in the range of from 40% to 75%, a tire having an adequate ground contact surface and more excellent handling stability can be obtained. In particular, during cornering traveling of motorcycles, handling stability can be improved in a banked state. Here, the tire sectional height SH refers to ½ of the difference between the outer diameter of a tire, and the rim diameter of a rim that is specified in the above-described industrial standards.

Furthermore, in the tire of the present invention, the negative ratio is preferably in the range of from 5% to 30%. By setting the negative ratio in the above-described range, handling stability and ride comfort can be favorably maintained while ensuring drainage. Here, the negative ratio is the ratio of the area of grooves to the area of the tread surface assuming no grooves, meaning the ratio of the groove area, excluding sipes, to the area of the tread portion.

The tire of the present invention is particularly suitable as a rear tire for motorcycles. The tire of the invention can be applied to both radial and bias structures, and is useful as a bias tire.

EXAMPLES

Hereinafter, the present invention will be described in more detail by way of Examples.

Example 1

A motorcycle pneumatic bias tire of the tire size 180/65B16 having the structure illustrated in FIGS. 1 and 2 was prepared. As illustrated in the figure, this tire was a rear tire including a carcass as a skeleton composed of two carcass plies and a belt composed of three belt layers located on the outer side in the tire radial direction, and a flipper that wraps a bead core from the inner side in the tire radial direction was arranged between the carcass and the bead core.

The two carcass plies were reinforced by ply cords (material: polyamide) with an end count of 4.6 per 5 mm and were arranged to intersect each other at a cord angle of ±35° with respect to the tire equator CT. The three belt layers were reinforced by belt cords (materials: aramid, aramid, and polyamide from the inner layer) with an end count of 4.4 per 5 mm, arranged to intersect each other at a cord angle of ±20° with respect to the tire equator CT. Furthermore, the flippers were reinforced by reinforcing cords (material: aramid) with an end count of 3.6 per 5 mm and a cord angle of 45° with respect to the tire radial direction.

In the tire of Example 1, the outer end portion of the flipper in the tire width direction and the outer end portion of the carcass ply in the tire width direction, which is located on the inner side in the tire radial direction, extended to the inner side of the tire width direction from the end portion of the belt in the tire width direction. The height of the inner end portion of the flipper in the tire width direction was lower than the height of the tire maximum width position. The ratio of the height SWH of the tire maximum width position to the tire sectional height SH was 59.5%, with a negative ratio of 12.6%.

Comparative Example 1

A test tire of Comparative Example 1 was prepared in the same manner as in Example 1, except that the flipper was not placed, in accordance with the conditions shown in Table 1 below.

Comparative Example 2

A test tire of Comparative Example 2 was prepared in the same manner as in Example 1, except that the position of the outer end portion of the flipper in the tire width direction was changed to a position where the flipper does not overlap with the end portion of the belt in the tire width direction, in accordance with the conditions shown in Table 1 below.

These rear tires of Example 1 and Comparative Examples 1 and 2 were mounted on a 1,800 cc class, high-load, high-torque, large motorcycle, and the following evaluations were conducted. A commercially available front tire was used. The results are shown together in Table 1 below.

Handling Stability Test

Driving tests were conducted on each vehicle to evaluate the handling stability in cornering traveling at high speeds by sensory evaluation by a test driver. The results are shown with the test tire in Comparative Example 2 as the standard.

Durability Test

The value of the load at which a tire was damaged when each vehicle was run with load applied in a stepwise manner was evaluated by converting the value of the load at which the tire was damaged into an index value with Example 1 as 100. Higher values indicate more excellent durability.

TABLE 1

|  | Example 1 | Comparative Example 1 | Comparative Example 2 |
|---|---|---|---|
| FL (mm) *1 | 5 | — | −1 |

TABLE 1-continued

|  | Example 1 | Comparative Example 1 | Comparative Example 2 |
|---|---|---|---|
| CL (mm) *2 | 10 | 10 | 10 |
| FL/CL (%) *3 | 50 | — | −10 |
| FH/SWH (%) *4 | 78 | — | 97 |
| Carcass ply (pieces) | 2 | 2 | 2 |
| Handling stability | Favorable | Poor | Standard |
| Durability (index) | 100 | 88 | 88 |

*1 The value of the overlap width FL between the belt and the flipper, measured along the tire surface in the tire width direction.
*2 The value of the overlap width CL between the belt and the carcass, measured along the tire surface in the tire width direction.
*3 The ratio of the overlap width FL between the belt and the flipper to the overlap width CL between the belt and the carcass, measured along the tire surface in the tire width direction, expressed as a percentage.
*4 The ratio of the height FH of the inner end portion of the tire width direction of the flipper to the height SWH of the tire maximum width position, expressed as a percentage.

As shown in the above-described table, it is clear that both handling stability and durability are improved in the tire of Example 1 in which the flipper is arranged between the carcass and the bead core in such a manner that the outer end portion in the tire width direction extends to the inner side of the tire width direction from the end portion of the belt in the tire width direction compared to the tires of Comparative Examples 1 and 2, which do not satisfy these conditions.

DESCRIPTION OF SYMBOLS

1 Bead core
2 Carcass
2a, 2b Carcass ply
2o Outer end portion of carcass in tire width direction
3 Belt
3a to 3c Belt layer
3x End portion of belt in in tire width direction
4 Flipper
4i Inner side end portion of flipper in tire width direction
4o Outer side end portion of flipper in tire width direction
5 Bead filler
6 Chafer (reinforcing layer)
10 Motorcycle tire
11 Tread portion
12 Sidewall portion
13 Bead portion

The invention claimed is:

1. A motorcycle tire comprising a carcass as a skeleton composed of at least one carcass ply extending toroidally between a pair of bead portions and folded and engaged around a pair of bead cores embedded one in each of the pair of bead portions and a belt composed of at least one belt layer arranged on the outer side of the carcass in the tire radial direction, wherein on each side of the tire
 a flipper is arranged between the carcass and the bead core so as to wrap the bead core from the inside in the tire radial direction, and
 an outer side portion of the flipper in the tire width direction extends to an end inside in the tire width direction from an end of the radially innermost belt layer in the tire width direction, wherein:
  on each side of the tire an outer portion of the at least one carcass ply in the tire width direction extends to an end inside in the tire width direction from the end of the radially innermost belt layer in the tire width direction,
  on each side of the tire an inner side portion of the flipper in the tire width direction extends to a radially outer end, and a height FH of the inner side portion of the flipper in the tire width direction is lower than a height SWH of a tire maximum width position,
  the ratio of the height FH of the inner side portion of the flipper in the tire width direction to the height SWH of the tire maximum width position is from 30% to less than 100%, and
  the ratio of an overlap width FL between the radially innermost belt layer and the flipper to an overlap width CL between the radially innermost belt layer and the at least one carcass ply, measured along the tire outer surface in the tire width direction, is in the range of from 25% to 80%.

2. The motorcycle tire according to claim 1, wherein each of the at least one carcass ply is a ply of cords having a single carcass ply cord angle with respect to the tire equator, the carcass ply cord angle being in the range of 20° to 50°.

3. A motorcycle tire comprising a carcass as a skeleton composed of at least one carcass ply extending toroidally between a pair of bead portions and folded and engaged around a pair of bead cores embedded one in each of the pair of bead portions and a belt composed of at least one belt layer arranged on the outer side of the carcass in the tire radial direction, wherein on each side of the tire
 a flipper is arranged between the carcass and the bead core so as to wrap the bead core from the inside in the tire radial direction, and
 an outer side portion of the flipper in the tire width direction extends to an end inside in the tire width direction from an end of the radially innermost belt layer in the tire width direction, wherein:
  on each side of the tire an inner side portion of the flipper in the tire width direction extends to a radially outer end, and a height FH of the inner side portion of the flipper in the tire width direction is lower than a height SWH of a tire maximum width position,
  the ratio of the height FH of the inner side portion of the flipper in the tire width direction to the height SWH of the tire maximum width position is from 30% to less than 100%, and
  each of the at least one carcass ply is a ply of cords having a single carcass ply cord angle with respect to the tire equator, the carcass ply cord angle being in the range of 20° to 50°.

4. A motorcycle tire comprising a carcass as a skeleton composed of at least one carcass ply extending toroidally between a pair of bead portions and folded and engaged around a pair of bead cores embedded one in each of the pair of bead portions and a belt composed of at least one belt layer arranged on the outer side of the carcass in the tire radial direction, wherein on each side of the tire
 a flipper is arranged between the carcass and the bead core so as to wrap the bead core from the inside in the tire radial direction, and
 an outer side portion of the flipper in the tire width direction extends to an end inside in the tire width direction from an end of the radially innermost belt layer in the tire width direction, wherein:
  on each side of the tire an outer portion of the at least one carcass ply in the tire width direction extends to an end inside in the tire width direction from the end of the radially innermost belt layer in the tire width direction,
  on each side of the tire an inner side portion of the flipper in the tire width direction extends to a radially outer end, and a height FH of the inner side portion of the flipper in the tire width direction is lower than a height SWH of a tire maximum width position, the ratio of the height FH of the inner side portion of the flipper in the tire width direction to the height SWH of the tire maximum width position is from 30% to less than 100%, and each of the at least one carcass ply is a ply of cords having a single carcass ply cord angle with respect to the tire equator, the carcass ply cord angle being in the range of 20° to 50°.

* * * * *